United States Patent [19]

Evans

[11] 4,354,556
[45] Oct. 19, 1982

[54] TURF CUTTING AND ROLLING APPARATUS

[76] Inventor: Mervyn L. Evans, 3 Little St., Chinchilla, Queensland, 4413, Australia

[21] Appl. No.: 319,422

[22] Filed: Nov. 9, 1981

[30] Foreign Application Priority Data

Nov. 10, 1980 [AU] Australia ............................. PE6411
Apr. 3, 1981 [AU] Australia ............................. PE8304

[51] Int. Cl.³ ...................... A01B 45/04; B65H 17/46
[52] U.S. Cl. .................................. 172/19; 242/86.52; 414/911; 414/920
[58] Field of Search ................ 172/19, 20; 242/86.52, 242/86.5 R; 414/911, 920

[56] References Cited

U.S. PATENT DOCUMENTS

| 2,655,976 | 10/1953 | Lovin | 242/86.52 X |
| 3,387,666 | 6/1968 | Hadfield | 172/20 |
| 3,473,755 | 10/1969 | Brown | 242/86.52 |
| 3,779,208 | 12/1973 | Gay | 172/19 X |
| 3,812,918 | 5/1974 | Beck | 172/19 |
| 3,958,772 | 5/1976 | Hynson | 242/86.5 R |
| 3,982,711 | 9/1976 | Bradley et al. | 172/19 X |
| 4,084,763 | 4/1978 | Zamboni | 414/911 X |
| 4,154,470 | 5/1979 | Daglish | 414/911 X |

FOREIGN PATENT DOCUMENTS 1389354 4/1975 United Kingdom ................ 414/911

Primary Examiner—Paul E. Shapiro
Attorney, Agent, or Firm—D. Paul Weaver

[57] ABSTRACT

Tractor-mounted apparatus for cutting, rolling and laying turf has parallel side cutters in front of a horizontal bottom cutter for cutting a strip of turf as the tractor advances, the turf strip being wound on a roller on a roller carrier behind the tractor and mounted on a lift frame for oscillation about an upright axis. A completed turf roll on the roller can be elevated by the lift frame and, by swinging the roller carrier, can be moved back through a right angle for unloading onto a platform, or swung through a further right angle and lowered to the ground for laying the turf as the tractor advances.

4 Claims, 4 Drawing Figures

TURF CUTTING AND ROLLING APPARATUS

BACKGROUND OF THE INVENTION

This invention relates to turf cutting, rolling and laying apparatus.

A variety of machines have been devised for cutting and rolling turf, the rolls of turf subsequently being loaded, normally manually, on a vehicle to be transported to the required site to be laid, and then laid manually.

The general object of the present invention is to provide simple and economical apparatus for cutting and rolling turf, and which may be used also for lifting the rolls of turf so they can be quickly and easily loaded on a transporting vehicle, or alternatively so they can be carried by the apparatus to the required site, the apparatus also being capable of laying the turf.

BRIEF SUMMARY OF THE INVENTION

Apparatus according to the invention for cutting, rolling and laying turf includes a vehicle with a wheel-mounted main frame, a pair of upright side cutters mounted on the main frame for making two parallel cuts in turf, as the vehicle advances, to define the sides of a turf strip, a horizontal cutter, mounted under the main frame and behind the side cutters, cuts below the turf strip, freeing it from the soil. The turf strip so cut is engaged by and wound on a roller rotatable on a roller carrier mounted oscillatably on a lift frame on the vehicle. When sufficient turf has been cut and rolled, the side and bottom cutters are lifted, and the lift frame is operated to raise the roller and the turf wound thereon. The roller, substantially horizontal, may then be swung through a right angle so the turf roll, extending to the rear, may be unloaded onto a suitable transporter or other support, or it may be swung through a further right angle and lowered to ground to be turfed, as the vehicle advances.

BRIEF DESCRIPTION OF THE DRAWINGS

A preferred embodiment of the invention is shown in the accompanying drawings, wherein.

DETAILED DESCRIPTION OF THE PREFERRED EMBODIMENT

Figure 1:
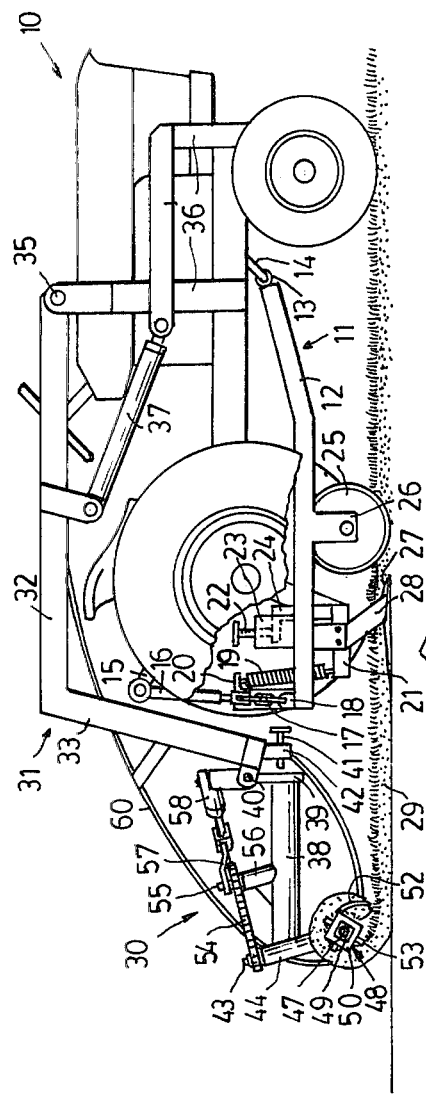
FIG. 1 is a partly broken-away side elevation of apparatus according to the invention, its roller being lowered in position to roll on it a strip of turf cut by the apparatus.

The apparatus illustrated includes a fairly small tractor 10, having below its chassis a cutter frame 11 with two rigidly interconnected side members 12, their rear parts parallel, their front parts forwardly convergent to an eye 13 pivotally engaged by a sturdy staple 14 fixed under the tractor chassis. The tractor's normal three-point suspension gear is removed, except for its hydraulically operated lifting levers 15, which are connected by connecting rods 16 and links 17 to a pair of apertured lugs 18 at the sides of the rear of the cutter frame 11, which thus can be pivotally raised or lowered. The rear of the cutter frame 11 is urged downwardly by springs 19 connected between a spring-mounting bracket 20 on the rear of the cutter frame 10 and a stop bracket 21 fixedly secured to the rear of the tractor chassis. A pair of tilt adjustment screws 22 engaged in screw brackets 23 on the cutter frame limit the downward movement of the cutter frame by engaging a pair of stops 24 on the stop bracket 21.

A pair of coulters 25 are coaxially mounted rotatably on lugs 26 extending down from the side members 12 of the cutter frame, and behind the coulters in a transverse horizontal bottom cutter blade 27 carried by a pair of hangers 28 depending from the cutter frame sides.

As the tractor 10 is advanced, the cutter frame 11 can be lowered by operation of the lifting levers 15 and the action of the springs 19 so the coulters make parallel cuts in the turf to define the sides of a turf strip 29 which is separated from the soil by the horizontal bottom cutter 27.

When the apparatus is used to cut a number of adjacent strips of turf, the tractor will be slightly tilted, its wheels at one side travelling over turf still to be cut, and at the other side upon soil from which turf has been removed. The tilt adjustment screws 22 are used to bring the bottom cutter to horizontal position.

The turf strip 29 is formed into a roll by a roller carrier assembly indicated generally at 30, and mounted on a lift frame 31. The lift frame includes a pair of parallel top arms 32 rigidly secured at their rear ends to a pair of parallel downwardly extending back arms 33 interconnected by a cross-member 34. The top arms are coaxially pivoted at 35 to a mounting frame 36 secured to the tractor chassis, so that the lift frame extends over, and down behind, the tractor's drive wheels. The lift frame may be pivotally raised or lowered by a pair of hydraulic cylinders 37 connected between the mounting frame 36 and the lift frame top arms 32.

The roller carrier assembly includes a carrier arm 38 rigidly secured at its front to a transverse pivot plate 39 pivoted about a transverse axis between a pair of lugs 40 on the lower parts of the lift frame back arms 33. The pivotal downward movement of the carrier arm is limited adjustably by a pair of stop screws 41 threadedly engaged in screw brackets 42 extending down from the bottom ends of the lift frame back arms.

A shaft 43, rotatable in a tubular bearing 44 secured to the rear of the carrier arm 38, has mounted coaxially on its lower end a turntable 45 under an annular plate 46 fixed on the lower end of the bearing 44. Rigidly secured under, and radiating from, the turntable 45 is a shaft 47 on which is rotatable a square-section roller 48 consisting of a roller core 49 on which any one of a number of similar square-section roller sleeves 50 is slidably engaged and releasably retained thereon by a pair of spring-loaded catch arms 51 (omitted from FIG. 1) engaging the distal end of the roller core. Extending from the roller sleeve 50 are a transverse series of teeth 52 for engaging and holding a strip of turf, and a number of longitudinal flanges 53 for assisting the roller to rotate when drawn over turf.

Figure 2:
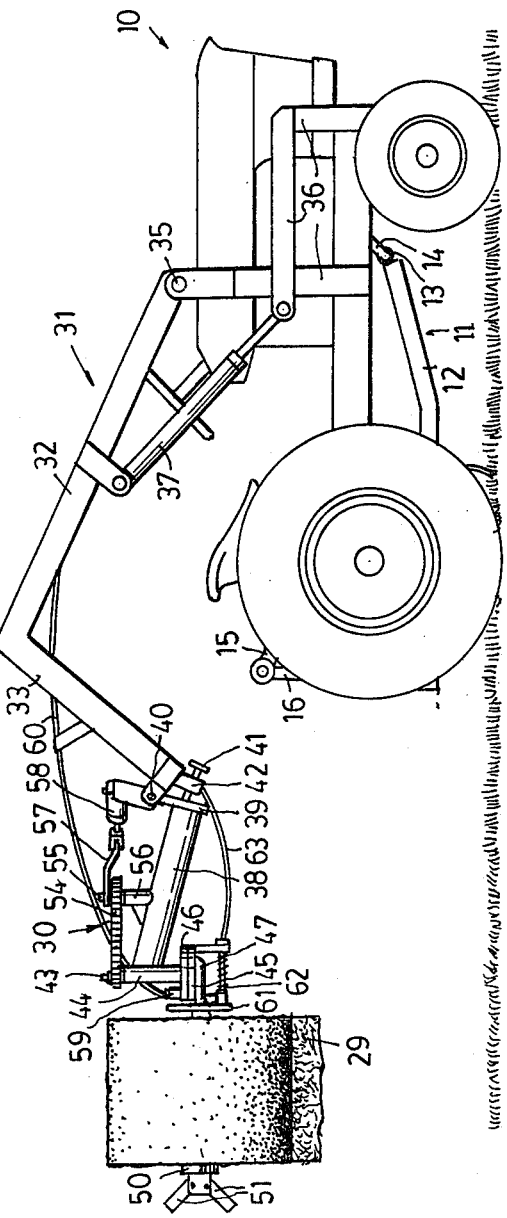
FIG. 2 is a side elevation of the apparatus, its roller carrying a complete roll of turf and moved to a second position for unloading the turf roll.
Figure 3:
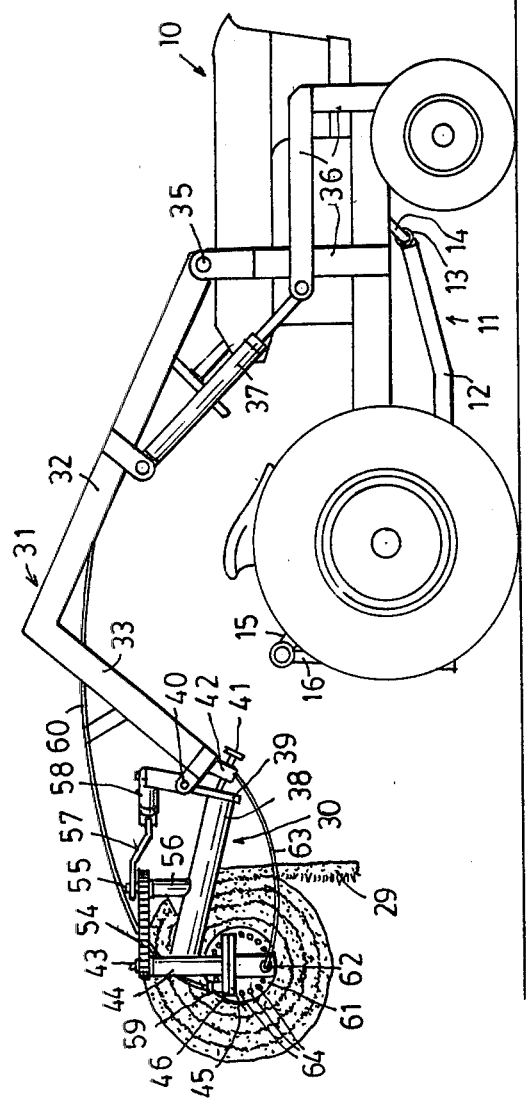
FIG. 3 is a side elevation of the apparatus with its roller, carrying a roll of turf, moved to a third position.

The roller 48 may be swung to any of the positions shown in FIGS. 1, 2 and 3, that is, transversely behind the bottom cutter 27; or turned through a right angle to extend to the rear; or turned through a further right angle to extend transversely, behind one of the tractor drive wheels. The shaft 43 is connected by a sprocketand-chain drive 54 to a shaft 55 rotatable in a bearing 56 on the carrier arm 38 and having fixed to its upper end a lever 57 connected to the piston of a hydraulic cylinder 58 mounted above the pivot plate 39 and operable to move the roller to any of the said three positions. A plunge catch 59 on the annular plate 46 is engageable with the turntable 45 to retain the roller in any of the said positions, and may be released, by a flexible control cable 60, by the drive of the tractor.

To the inner end of the roller core 49 there is fixed a circular plate 61. A second plunger catch 62 mounted under the turntable 45 may be engaged, through a second flexible control cable 63, with any of a circular series of holes 64 in the plate 61 to restrain the roller against rotation.

In use, as the apparatus is advanced to cut the turf strip 29, as before described, the lift frame 31 is lowered to bring the roller 48 onto the turf strip. The teeth 52 penetrate and grip the turf strip, which consequently is roller upon the roller sleeve 48. Owing to the pivotal mounting of the carrier arm 38, the roller 48 is free to rise as the diameter of the turf roll increases. When an adequate length of turf strip has been cut and rolled, the cutter frame 11 is raised by the lifting levers 15, the tractor 10 is halted and the plunger catch 62 is engaged to prevent further rotation of the roller 48.

The lift frame 31 is then raised pivotally by the hydraulic cylinders 37. If the turf roll is to be loaded onto a transporter vehicle, it is swung through a right angle to the position shown in FIG. 2 by operating the hydraulic cylinder 58, and is automatically locked in this position by the plunger catch 59. The tractor is driven to the transporter, and backed to bring the turf roll over the transporter platform. The turf roll is lowered onto the platform, the catches 51 are released, and the tractor 10 is advanced, leaving the turf roll, wound upon the roller sleeve 50. Before further turf is cut and rolled, a fresh roller sleeve is fitted to the roller core 49.

Figure 4:
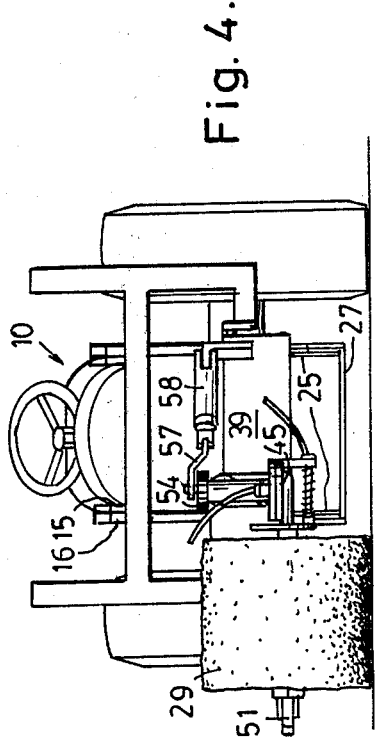
FIG. 4 is a rear elevation of the apparatus with a roll of turf brought to a position for laying.

If the turf roll is to be laid by the apparatus, it is swung through a further right angle to the position shown in FIG. 3 and then lowered to the ground, as shown in FIG. 4, at the required location. The plunger catch 62 is released and the tractor 10 is advanced, rolling out the complete turf strip 29.

I claim:

1. Apparatus for cutting, rolling and laying turf, of the type including a vehicle with a wheel-mounted main frame, and a pair of upright side cutters and a transverse bottom cutter mounted on said main frame and adapted to cut a turf strip as said vehicle advances, wherein:

a lift frame is mounted on said main frame, a roller is mounted on said lift frame for pivotal movement about a substantially upright axis, said roller being adapted to be pivoted on and lowered by said lift frame to a turf rolling position lying on and engaging said turf strip and winding said turf strip on it as said vehicle advances, said roller being further adapted to be raised by and pivoted on said lift frame to an unloading position extending rearwardly of said vehicle, said roller being further adapted to be pivoted on and lowered by said lift frame to a turf laying position displaced 180° from said turf rolling position, and, as said vehicle advances, to lay said turf roll.

2. Apparatus according to claim 1 wherein:

said roller is connected pivotally to said lift frame by a roller carrier pivoted about a transverse axis to said lift frame, and adjustable stop means are provided for limiting the pivotal downward movement of said roller carrier.

3. Apparatus according to claim 2 wherein:

means are provided for pivoting said roller, relative to said roller carrier, to said turf rolling, unloading and turf laying positions, and for releasably locking it in each such position.

4. Apparatus according to claim 1 wherein said roller includes:

a rotatable core, a sleeve slidably but non-rotatably engaged on said roller core, means for releasably locking said roller sleeve on said roller core, and teeth extending from said sleeve, adapted to engage and grip said turf strip.

* * * * *